(12) United States Patent
Nakamura

(10) Patent No.: US 11,773,899 B2
(45) Date of Patent: Oct. 3, 2023

(54) ROLLING BEARING

(71) Applicant: NTN Corporation, Osaka (JP)

(72) Inventor: Tomoya Nakamura, Mie (JP)

(73) Assignee: NTN Corporation, Osaka (JP)

( * ) Notice: Subject to any disclaimer, the term of this patent is extended or adjusted under 35 U.S.C. 154(b) by 71 days.

(21) Appl. No.: 17/600,696

(22) PCT Filed: Mar. 19, 2020

(86) PCT No.: PCT/JP2020/012369
§ 371 (c)(1),
(2) Date: Oct. 1, 2021

(87) PCT Pub. No.: WO2020/203361
PCT Pub. Date: Oct. 8, 2020

(65) Prior Publication Data
US 2022/0186776 A1 Jun. 16, 2022

(30) Foreign Application Priority Data
Apr. 2, 2019 (JP) ................................ 2019-070552

(51) Int. Cl.
*F16C 19/16* (2006.01)
*F16C 33/38* (2006.01)
*F16C 33/66* (2006.01)

(52) U.S. Cl.
CPC .............. *F16C 19/16* (2013.01); *F16C 33/38* (2013.01); *F16C 33/3831* (2013.01); *F16C 33/6696* (2013.01)

(58) Field of Classification Search
CPC ...... F16C 33/38; F16C 33/3831; F16C 33/44; F16C 33/445; F16C 33/4611; F16C 33/56; F16C 33/565; F16C 33/6696
See application file for complete search history.

(56) References Cited

U.S. PATENT DOCUMENTS

| | | | |
|---|---|---|---|
| 4,764,037 A * | 8/1988 | Hawkinson ............ | F16C 33/44 384/527 |
| 9,121,450 B2 * | 9/2015 | Lee ...................... | F16C 33/4641 |
| 2009/0060706 A1 * | 3/2009 | Habibvand .............. | F04D 7/02 384/447 |

(Continued)

FOREIGN PATENT DOCUMENTS

| DE | 101 10 915 | 9/2002 |
|---|---|---|
| DE | 10 2018 115 766 | 1/2019 |
| JP | 2-20854 | 5/1990 |

(Continued)

OTHER PUBLICATIONS

Translation of JP2017-166627 obtained Jan. 25, 2023.*

(Continued)

*Primary Examiner* — James Pilkington
(74) *Attorney, Agent, or Firm* — Wenderoth, Lind & Ponack, L.L.P.

(57) ABSTRACT

A rolling bearing includes an inner ring, an outer ring, rolling elements, and a retainer that holds the rolling elements. The retainer includes a metal portion and a sliding resin portion The metal portion has communication holes each having a plurality of openings on the surface of the metal portion, and the sliding resin portion is disposed in the communication holes.

5 Claims, 6 Drawing Sheets

(56) References Cited

U.S. PATENT DOCUMENTS

2009/0220181 A1   9/2009   Yamada et al.
2016/0108965 A1   4/2016   Kokumai et al.

FOREIGN PATENT DOCUMENTS

| JP | 2003-49841 | | 2/2003 |
|----|------------|---|--------|
| JP | 2009-174631 | | 8/2009 |
| JP | 2012-255521 | | 12/2012 |
| JP | 2013-47553 | | 3/2013 |
| JP | 2015-232382 | | 12/2015 |
| JP | 6178117 | | 7/2017 |
| JP | 2017-166627 | * | 9/2017 |
| WO | 2007/058351 | | 5/2007 |

OTHER PUBLICATIONS

Extended European Search Report dated Apr. 19, 2022 in corresponding European Patent Application No. 20782806.2.
International Preliminary Report on Patentability (Chapter I) dated Sep. 28, 2021 in International (PCT) Application No. PCT/JP2020/012369.
International Search Report dated Jun. 23, 2020 in International (PCT) Application No. PCT/JP2020/012369.

* cited by examiner

ROLLING BEARING

TECHNICAL FIELD

The present invention relates to a rolling bearing.

BACKGROUND ART

A bearing used for a turbo pump of, e.g., a rocket engine is used in a high-speed rotating environment in a liquid propellant. Particularly in an environment, e.g., of liquid hydrogen or liquid oxygen, because the bearing is exposed to cryogenic temperatures, it is difficult to use a generally used fluid lubricant such as oil or grease. Thus, a solid lubricant such as a resin is used as the lubricant of such a bearing. However, since the bearing for a turbo pump is rotated at high speeds, it is difficult to withstand high hoop stress with a retainer made entirely of resin, and the bearing is often used with various reinforcements.

As an example of such a retainer, there has been proposed a retainer made of a composite material obtained by impregnating a glass fiber cloth with polytetrafluoroethylene (hereinafter, referred to as "PTFE"), in which glass fibers on a surface layer are subjected to hydrofluoric acid treatment (see JP Patent Publication H02-020854B). This retainer can be used in a cryogenic and high-speed rotating environment since strength is imparted by the glass fiber cloth and self-lubricity is imparted by PTFE.

However, in this retainer, a ring material is formed by winding a composite material impregnated with PTFE around a glass fiber cloth. Therefore, the degree of freedom in structural design is limited by the glass fiber cloth as a structural member. Further, the content ratio of PTFE in the composite material is also limited, and there is a possibility that sufficient lubricity cannot be exhibited.

When abrasion progresses beyond the surface layer subjected to hydrofluoric acid treatment, the glass fibers are exposed, and could damage rolling elements and guide rings. In addition, the hydrofluoric acid treatment may reduce the strength of the glass fiber cloth, and thus the strength of the retainer may decrease.

Furthermore, in order to prolong the life of the bearing and as a measure against wear of the bearing, it is conceivable to increase the thickness of the layer subjected to the hydrofluoric acid treatment, but this could increase the time for the hydrofluoric acid treatment and also lower the strength of the retainer.

Therefore, a self-lubricating retainer has been proposed in which a resin having lubricity is insert-molded on an aluminum base material to integrate the base material and the resin (see JP Patent Publication 6178117B2).

The retainer disclosed in JP Patent Publication 6178117B2 is formed by joining an aluminum base material and a resin layer on the surface of the aluminum base material. However, depending on the operation or the environment of the bearing, a temperature change such as heating or cooling may occur. Thus, due to a difference in thermal stress between the aluminum base material and the resin layer, the resin layer could be broken at or near a joint between the aluminum base material and the resin layer, and the rolling element could come into direct contact with the aluminum base material. Furthermore, while the resin is formed by insert molding, in a case where PTFE is used as the solid lubricant, insert molding may be difficult in terms of fluidity when the ratio of the solid lubricant in the resin is high, and thus it is necessary to reduce the content ratio of the solid lubricant in the resin. When the content ratio of the solid lubricant is reduced, sufficient lubricity may not be exhibited.

Therefore, an object of this invention is to obtain a retainer that has a high degree of freedom in design, is easy to manufacture, has sufficient strength, can increase the ratio of a solid lubricant in a resin layer, and reduce direct contact between the rolling elements and the base material constituting the retainer.

SUMMARY OF THE INVENTION

In order to achieve this object, this invention provides a rolling bearing comprising: an inner ring; an outer ring disposed radially outwardly of the inner ring; a plurality of rolling elements disposed between the inner ring and the outer ring; and a retainer retaining the plurality of rolling elements along a circumferential direction, wherein the retainer includes a metal portion and a sliding resin portion, the metal portion includes communication holes each having a plurality of openings on a surface of the metal portion, and a resin is disposed in each of the communication holes to constitute a portion of the sliding resin portion.

The metal portion, which includes the communication holes, may have portions each constituting a three-dimensional mesh lattice.

Further, the metal portion may be made of a metal selected from an aluminum alloy, a titanium alloy, a stainless alloy, and an inconel.

The sliding resin portion may be made of a resin material mainly constituted by polytetrafluoroethylene.

In one arrangement, the openings of the communication holes are disposed on either or both of pocket surfaces of the retainer, or a guide surface of the retainer, and a layer formed of, the resin constituting the sliding resin portion is formed on the pocket surfaces and the guide surface of the retainer.

This rolling bearing can be incorporated in a rocket engine turbo pump.

A retainer used in a bearing of this invention includes a metal portion and a sliding resin portion. The metal portion has a communication hole, and a resin constituting the sliding resin portion is disposed in the communication holes. Thus, even if the sliding resin portion is broken due to a difference in thermal stress between the metal portion and the sliding resin portion, because the sliding resin portion is coupled as a single unit in the communication holes, the sliding resin portion hardly moves from the surface of the metal portion. The rolling elements are therefore prevented from coming into direct contact with the metal portion, and contact between the rolling elements and the sliding resin portion is maintained. Further, while the resin constituting the sliding resin portion generally has a high linear expansion coefficient, since the resin is restrained by the metal portion, the linear expansion coefficient can be prevented from increasing even at high temperatures. As a result, the retainer as a whole maintains a low linear expansion coefficient.

Moreover, because the sliding resin portion is formed by pouring the resin constituting the sliding resin portion into the communication holes of the metal portion, the sliding resin portion can be treated under the condition that the resin has fluidity, and as the resin, a resin having a high content ratio of PTFE can be used.

In addition, since the metal portion can be manufactured using a 3D printer or by precision casting, the degree of freedom in design is high, and manufacturing is facilitated.

Furthermore, because the retainer includes a metal portion, it is possible to increase the structural strength of the retainer, and ensure sufficient strength.

DETAILED DESCRIPTION OF THE INVENTION

The embodiment of the present invention is now described with reference to the drawings.

Figure 1A:
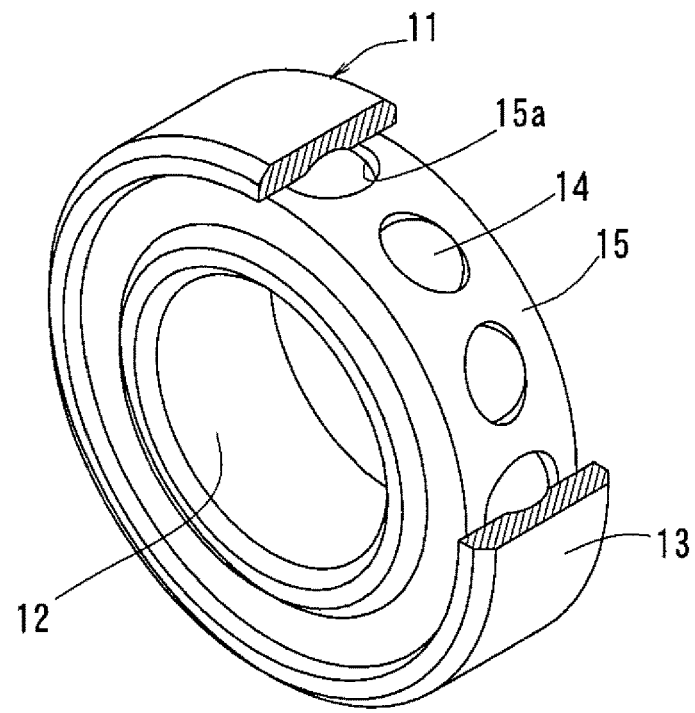
FIG. 1A is a partially cutaway perspective view illustrating an example of a rolling bearing of this invention.
Figure 1B:
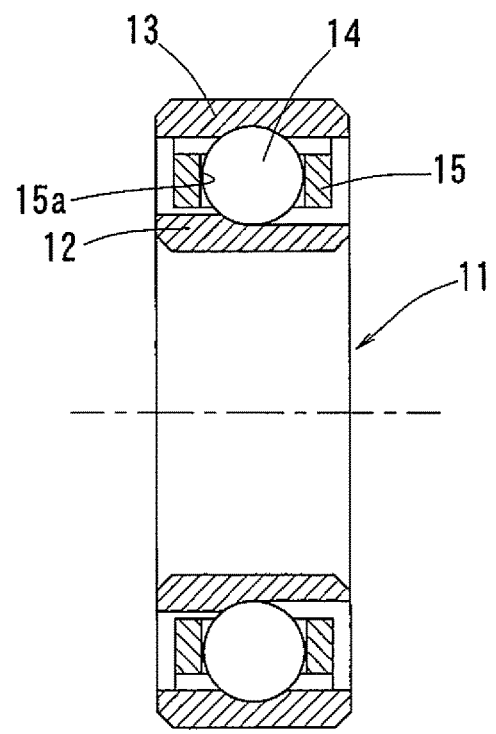
FIG. 1B is a cross-sectional view of FIG. 1A.

As shown in FIGS. 1A and 1B, the rolling bearing 11 of this invention is a bearing including an inner ring 12, an outer ring 13 disposed radially outwardly of the inner ring 12, a plurality of rolling elements 14 disposed between the inner ring 12 and the outer ring 13, and a retainer 15 retaining the plurality of rolling elements 14 along the circumferential direction.

Raceway surfaces are formed on an outer peripheral surface of the inner ring 12 and an inner peripheral surface of the outer ring 13, respectively. The raceway surface of the inner ring 12 and the raceway surface of the outer ring 13 are each formed as a groove having an arcuate sectional shape in the radial direction. The rolling elements 14 are disposed in an annular space defined between these raceway surfaces at intervals along the circumferential direction. The rolling bearing 11 according to this embodiment is a ball bearing, and the rolling elements 14 are balls received between arcuate raceway surfaces. The retainer 15 is an annular body, such as a cylindrical body, disposed between the inner ring 12 and the outer ring 13. The retainer 15 has circular annular portions located on both axial sides of the retainer 15, and a plurality of columns disposed at predetermined intervals along the circumferential direction so as to connect the annular portions together. Spaces between the adjacent columns define pockets for receiving the respective rolling elements 14. That is, the retainer 15 has a plurality of pocket holes 15a provided at equal intervals in the peripheral wall of the annular body, and the rolling elements 14 are received in the respective pocket holes 15a.

The inner ring 12 and the outer ring 13 are made of a metal such as martensitic stainless steel (e.g., SUS440C).

Examples of a material constituting the rolling elements 14 include metals such as martensitic stainless steel (e.g., SUS440C) and ceramic materials.

The retainer 15 comprises a metal portion and a sliding resin portion. Examples of a metal constituting the metal portion include an aluminum alloy, a titanium alloy, a stainless alloy, and an inconel. The resin constituting the sliding resin portion mainly includes a lubricating resin, and a support resin may be added thereto as necessary. Examples of the lubricating resin include fluororesins such as polytetrafluoroethylene (PTFE), and examples of the support resin include thermoplastic resins such as polyether ether ketone (PEEK), polyphenylene sulfide (PPS), and polyamide (PA). Among these resins, a resin mainly composed of PTFE is preferable. The sliding resin portion may be 100% PTFE.

The metal portion has communication holes each having a plurality of openings on the surface of the metal portion. As shown conceptually in FIG. 2A, each communication hole 21 has a plurality of (two in FIG. 2A) openings 21'.

Figure 2A:
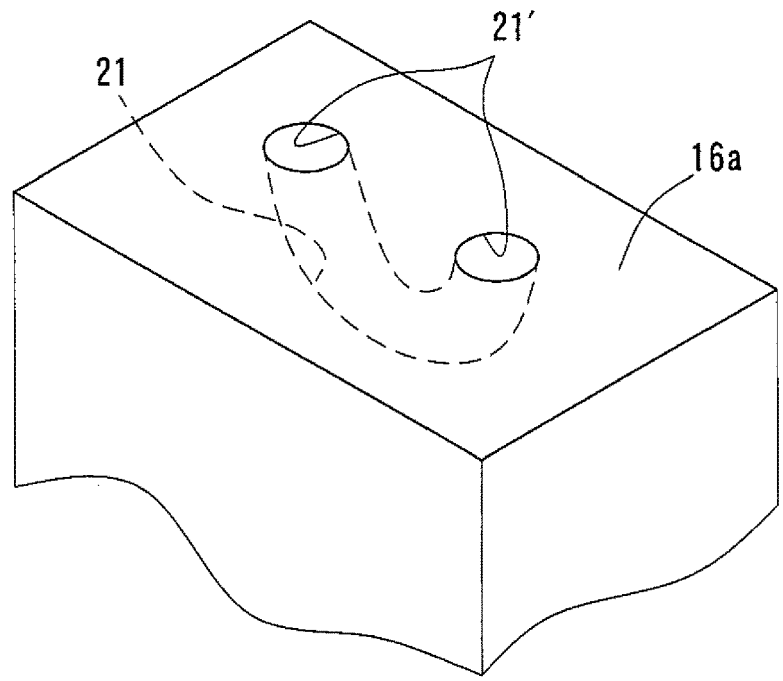
FIG. 2A is a schematic diagram illustrating an example of a communication hole.
Figure 2B:
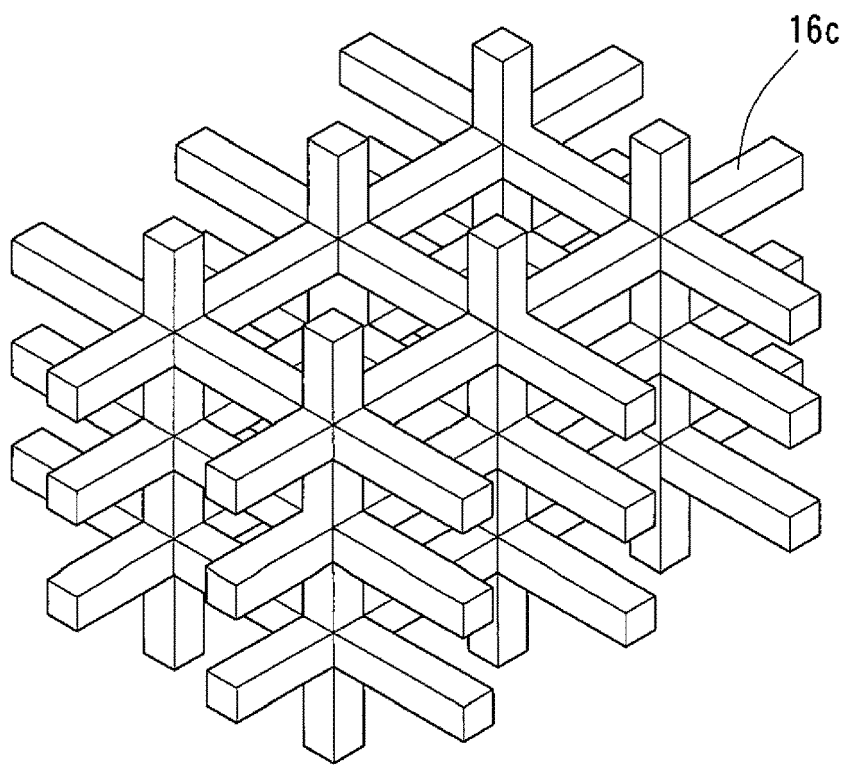
FIG. 2B is a schematic diagram illustrating an example of a three-dimensional mesh lattice.

FIG. 2B shows an example in which the communication holes are regularly arranged by forming the metal portion as a three-dimensional mesh lattice 16c. As shown, the spaces defined by the lattice 16c communicate with the outside and constitute the communication holes. As illustrated in FIG. 2B, the three-dimensional mesh lattice 16c is formed by arranging straight metal columns at equal intervals along each of the x, y and z axes such that the first metal columns extending along the z axis pass through the intersections between the second metal columns extending along the x axis and the third metal columns extending along the y axis. Specific examples of such a structure include a structure in which the intersections form a simple cubic lattice and the intersections are three-dimensionally coupled together.

Another example of the three-dimensional mesh lattice may be a structure in which the intersections form a body-centered cubic lattice or a face-centered cubic lattice, and the intersections are three-dimensionally coupled together.

Figure 3A:
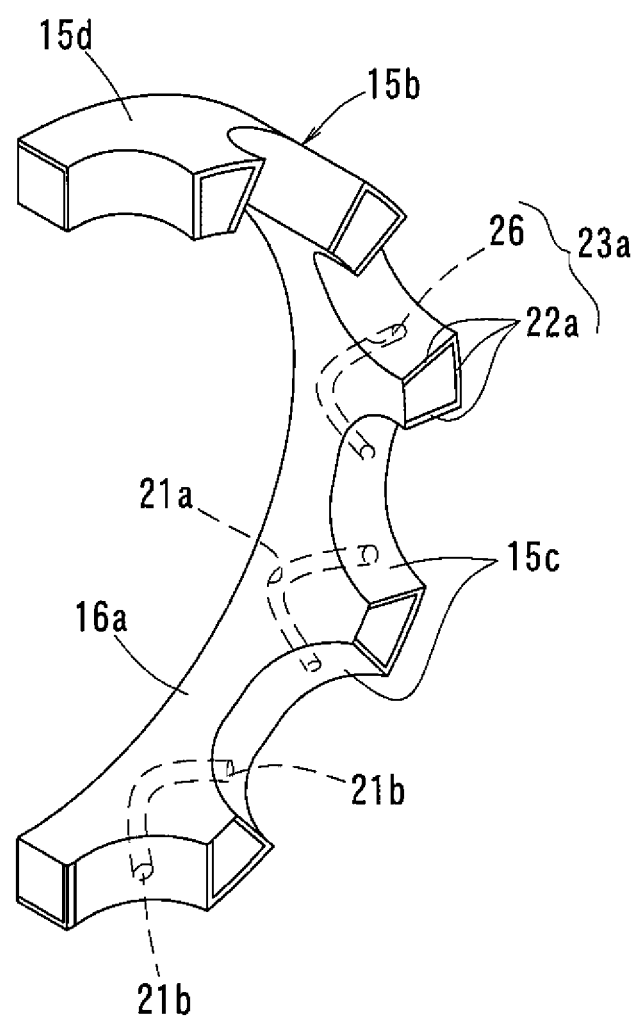
FIG. 3A is a partially enlarged cutaway view illustrating an example of a retainer of the rolling bearing of this invention.
Figure 3B:
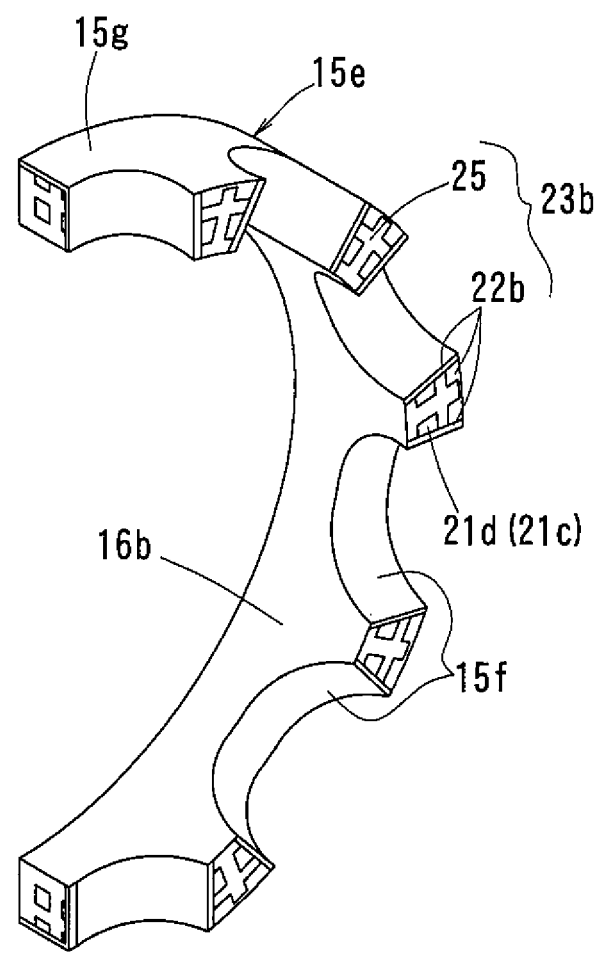
FIG. 3B is a partial, enlarged cutaway view illustrating another example of the retainer of the rolling bearing of this invention.

Specific examples of the retainer including the metal portion 16a and the three-dimensional mesh lattice 16c are illustrated in FIGS. 3A and 3B. The example illustrated in FIG. 3A is an example of a retainer 15b using the communication holes 21 as illustrated in FIG. 2A. Communication holes 21a each having a plurality of openings 21b are formed in the retainer 15b such that the plurality of openings 21b are provided on either or both of pocket surfaces 15c of the retainer 15b and a guide surface 15d of the retainer 15b. The above-mentioned resin is disposed in the communication holes 21a to form communication resin portions 26, and a sliding layer 22a comprising the above-mentioned resin is formed on the pocket surfaces 15c and the guide surface 15d of the retainer 15b over the entire areas thereof, thereby forming the sliding resin portion 23a. Thus, the resin inside the communication hole 21a (forming the communication resin portions 26) is connected by to the sliding layer 22a, and the sliding resin portion 23a is integrated. Therefore, even if the sliding layer 22a of the sliding resin portion 23a is broken due to a difference in thermal stress between the metal portion 16a and the sliding resin portion 23a, the position of the sliding layer 22a remains unchanged, thus preventing direct contact of the rolling elements 14 with the metal portion 16a, while maintaining contact between the rolling element 14 and the sliding resin portion 23a.

The example illustrated in FIG. 3B is a retainer 15e using a metal portion 16b including a portion constituting the three-dimensional mesh lattice 16c illustrated in FIG. 2B. The openings 21d of the communication holes 21c which are spaces of the metal portion 16b of the retainer 15e are provided at pocket surfaces 15f and a guide surface 15g of the retainer 15e. The above-mentioned resin is disposed in the communication holes to form lattice-shaped resin portions 25, and the sliding layer 22b comprising the above-mentioned resin is formed on pocket surfaces 15f of the retainer 15 and a guide surface 15g of the retainer 15e over the entire areas thereof, thereby forming the sliding resin portion 23b. Thus, the resin inside the communication holes 21c (forming lattice-shaped resin portions 25) is connected to the sliding layer 22b, and the sliding resin portion 23b is integrated. Therefore, even if the sliding layer 22b of the sliding resin portion 23b is broken due to a difference in thermal stress between the metal portion 16b and the sliding resin portion 23b, the position of the sliding layer 22b remains unchanged, thereby preventing direct contact of the rolling element 14 with the metal portion 16b, while maintaining contact between the rolling elements 14 and the sliding resin portion 23b.

Figure 4A:
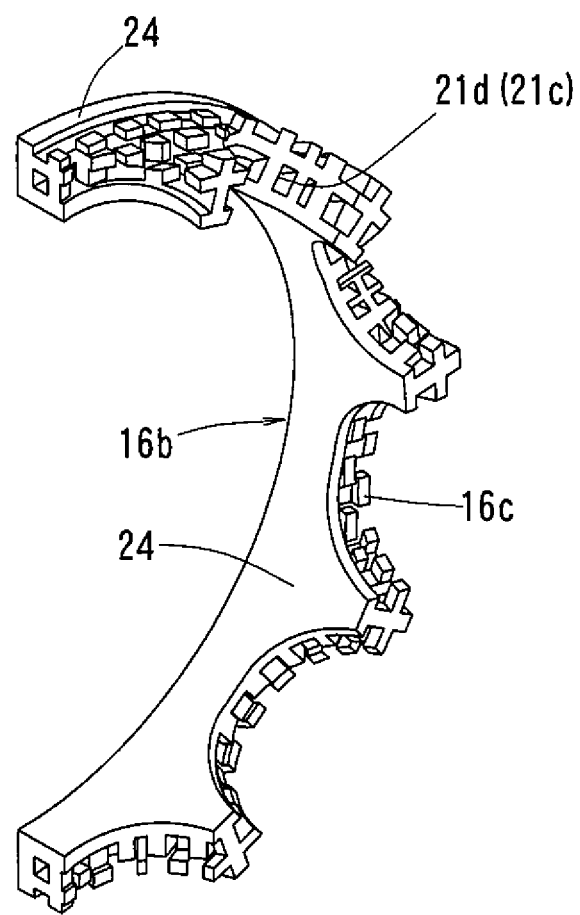
FIG. 4A is a partial, enlarged cutaway view of a metal portion in FIG. 3B.

The structure of the metal portion 16b constituting the retainer 15e illustrated in FIG. 3B is as illustrated in FIG. 4A. In this structure, the three-dimensional mesh lattice 16c is used as a main component of the structure, and a planar portion 24 comprising the above-mentioned metal is provided on a portion of the surface of the retainer 15e other than the pocket surfaces 15f and the guide surface 15g of the retainer 15e.

Figure 4B:
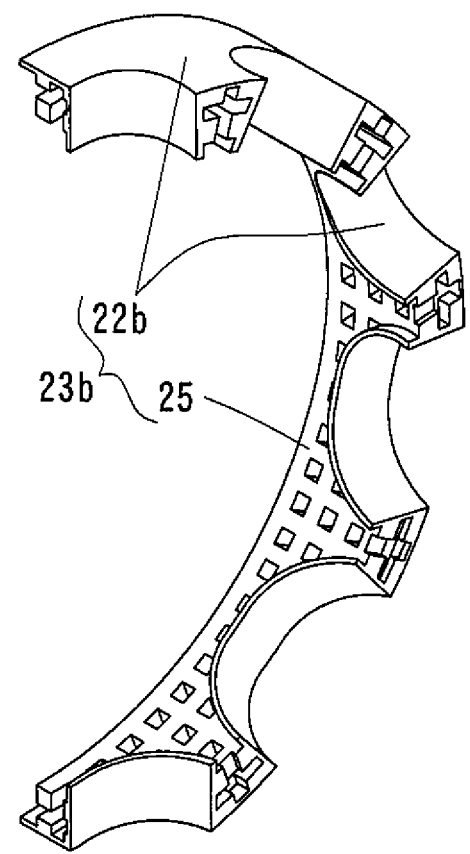
FIG. 4B is a partial, enlarged cutaway view of a sliding resin portion in FIG. 3B.

The above-mentioned resin is disposed in the communication holes 21c which are paces of the three-dimensional mesh lattice 16c to form the lattice-shaped resin portions 25, and the sliding layer 22b comprising the above-mentioned resin is formed on the pocket surfaces 15f and the guide surface 15g of the retainer 15e, thereby forming the sliding resin portion 23b illustrated in FIG. 4B.

The metal portion 16b can be manufactured using a 3D printer or by precision casting. The portions of the resin portion in the communication holes 21a of each of the sliding resin portion 23a and the lattice-shaped resin portions 25 of the sliding resin portion 23b can be manufactured, e.g., by melting the resin used under conditions of a temperature and a pressure within predetermined ranges and pouring the resin into the communication holes 21a, 21c of the metal portion 16a, 16b to fill the holes, or introducing the resin in the form of powder into the communication holes 21a, 21c of the metal portion 16a, 16b by pressurization or vibration and firing the resin. Further, the sliding layer 22a, 22b formed on the pocket surfaces 15c, 15f and the guide surface 15d, 15g of each of the retainers 15b and 15e can be manufactured in a manner similar to the above-described method, when forming the portions of the resin portion in the communication holes 21a of the sliding resin portion 23a, or the lattice-shaped resin portions 25 of the sliding resin portion 23b.

The rolling bearing manufactured by this invention can be used in a cryogenic and high-speed rotating environment, and can be used as a bearing incorporated in a rocket engine turbo pump.

In the above embodiment, the configuration of this invention has been described by exemplifying, as the rolling bearing 11, a ball bearing in which balls are adopted as the rolling elements 14. However, the present invention is not limited to this embodiment, and can be applied to various bearings having a retainer, such as rolling bearing 11 other than a ball bearing, for example, rolling bearings using rollers as the rolling elements 14.

DESCRIPTION OF THE NUMERALS

11: Rolling bearing
12: Inner ring
13: Outer ring
14: Rolling element
15, 15b, 15e: Retainer
15a: Pocket hole
15c, 15f: Pocket surface
15d, 15g: Guide surface
16a, 16b: Metal portion
16c: Three-dimensional mesh lattice
21, 21a, 21c: Communication hole
21', 21b, 21d: Opening
22a, 22b: Sliding layer
23a, 23b: Sliding resin portion
24: Planar portion
25: Lattice-shaped resin portion
26: Communication resin portion

What is claimed is:

1. A rolling bearing comprising:
   an inner ring;
   an outer ring disposed radially outwardly of the inner ring;
   a plurality of rolling elements disposed between the inner ring and the outer ring; and
   a retainer retaining the plurality of rolling elements along a circumferential direction, the retainer having pocket surfaces facing the rolling elements and a guide surface facing at least one of the outer ring and the inner ring;
   wherein the retainer includes a metal portion and a sliding resin portion formed of a resin, the metal portion comprises a three-dimensional mesh lattice portion, the three-dimensional mesh lattice portion includes straight metal columns at equal intervals extending along each of x, y and z axes such that first metal columns extending along the z axis pass through intersections between second metal columns extending along the x axis and third metal columns extending along the y axis, the mesh lattice portion defining communication holes with openings on a surface of the metal portion, the openings of the communication holes being disposed on at least one of (i) the pocket surfaces of the retainer, and (ii) the guide surface of the retainer; and
   wherein the sliding resin portion comprises a layer of the resin on the pocket surfaces and the guiding surface of the retainer and portions disposed in each of the communication holes.

2. The rolling bearing according to claim 1, wherein the metal portion is made of a metal selected from an aluminum alloy, a titanium alloy, a stainless alloy, and an inconel.

3. The rolling bearing according to claim 2, wherein the resin of the sliding resin portion is a resin material mainly constituted by polytetrafluoroethylene.

4. The rolling bearing according to claim 1, wherein the resin of the sliding resin portion is a resin material mainly constituted by polytetrafluoroethylene.

5. A rocket engine turbo pump comprising a rolling bearing according to claim 1.

* * * * *